US005960549A

United States Patent [19]

Höppner

[11] Patent Number: 5,960,549

[45] Date of Patent: Oct. 5, 1999

[54] PLASTIC HANDLE MEMBER FOR MANUALLY GUIDED POWER CHAIN SAWS

[75] Inventor: Klaus Höppner, Marbach, Germany

[73] Assignee: Andreas Stihl AG & Co., Waiblingen, Germany

[21] Appl. No.: 08/863,792

[22] Filed: May 27, 1997

Related U.S. Application Data

[63] Continuation of application No. 08/641,675, May 1, 1996, abandoned, which is a continuation-in-part of application No. 08/267,612, Jun. 29, 1994, abandoned.

[30] Foreign Application Priority Data

Jun. 30, 1993 [DE] Germany ............................ 43 21 652

[51] Int. Cl.[6] .................................................... B23D 57/02

[52] U.S. Cl. ................................ 30/381; 30/383; 30/520

[58] Field of Search ..................... 30/381, 520, 382–385

[56] References Cited

U.S. PATENT DOCUMENTS

| | | | |
|---|---|---|---|
| 3,140,746 | 7/1964 | La Force . | |
| 3,813,776 | 6/1974 | Frederickson et al. | 30/381 |
| 3,849,883 | 11/1974 | Kolorz | 30/381 |
| 4,138,812 | 2/1979 | Zimmerer et al. | 30/381 |
| 4,141,143 | 2/1979 | Hirschkoff et al. | 30/381 |
| 4,160,321 | 7/1979 | Källberg et al. . | |
| 4,178,685 | 12/1979 | Inaga | 30/381 |
| 4,198,752 | 4/1980 | Bross . | |
| 4,202,096 | 5/1980 | Nagashima | 30/381 |
| 4,219,932 | 9/1980 | Nagashima et al. | 30/381 |
| 4,296,553 | 10/1981 | Dirks et al. | 30/381 |
| 4,365,416 | 12/1982 | Overbury . | |
| 4,411,071 | 10/1983 | Takahashi et al. | 30/381 |
| 4,615,398 | 10/1986 | Nagashima | 30/381 |
| 4,670,985 | 6/1987 | Biersteker | 30/381 |
| 4,964,217 | 10/1990 | Siede et al. | 30/381 X |
| 5,029,561 | 7/1991 | Koga | 30/381 |
| 5,046,566 | 9/1991 | Dorner et al. | 30/381 |
| 5,243,764 | 9/1993 | Wieland | 30/381 |

FOREIGN PATENT DOCUMENTS

| | | |
|---|---|---|
| 3811788 | 10/1989 | Germany . |
| 8301035 | 3/1983 | Japan . |

*Primary Examiner*—M. Rachuba
*Assistant Examiner*—Boyer Ashley
*Attorney, Agent, or Firm*—Robert W. Becker & Associates

[57] ABSTRACT

A plastic handle member for manually guided power chain saws is provided. The handle member comprises a one-piece, at least partially tubular, front handle for holding a separate motor unit, the front handle being provided with a lower profiled bar. A rear control handle is provided having an upper portion for accommodating components for controlling a chain saw. A support member is disposed between the front handle and the control handle for interconnecting them. The front handle, the rear control handle, and the support member comprise a one-piece plastic body made of a single material and in conjunction with the lowered profile bar form a self-contained force polygon that absorbs load and vibrational forces by means of vibration-damping elements provided in supports disposed between the handle member and a housing of the separate motor unit for holding the housing of the motor unit.

14 Claims, 7 Drawing Sheets

PLASTIC HANDLE MEMBER FOR MANUALLY GUIDED POWER CHAIN SAWS

This application is a continuation of application Ser. No. 08/641,675 filed May 1, 1996 now abandoned, which is a continuation-in-part, of application Ser. No. 08/267,612 filed Jun. 29, 1994 now abandoned.

BACKGROUND OF THE INVENTION

The present invention relates to a plastic handle member for manually guided power chain saws, and has a one-piece, at least partially tubular, front handle for holding a motor unit, the front handle having mounting means for receiving vibration-damping elements; the handle member also has a rear control handle, in the upper portion of which are disposed components for controlling a gas lever and for controlling starting of the chain saw.

U.S. Pat. No. 4,160,321, Källberg et al, discloses a handle comprised of a plurality of individual parts that surround the motor unit; provided in the forward region of the motor unit is a handle that extends over the motor unit and forms a handgrip for the left hand of an operator. Disposed on this handle are receiving means for vibration-damping elements via which the motor unit is supported in a vibration-damping manner relative to the handle. Disposed in the rear region of the motor unit is the control handle, which is separate from the remaining parts of the handle. This control handle comprises an upper portion in which are accommodated the start and gas lever elements. This handle portion is connected to a side bar and to a bar that is disposed on the underside of the motor unit and leads toward the front to the handgrip. The overall handle, which comprises a plurality of individual parts that are interconnected by connecting means, forms a closed unit. The drawback of this known handle is that such an embodiment of a handle comprising a number of different individual parts is technically complicated and expensive to manufacture, especially since the connecting elements between the individual parts of the handle must be of such a stability or rigidity that they permanently withstand the various forces that act upon them. Furthermore, the individual aluminum parts of the handle are configured in different ways depending upon their function, so that the entire handle unit must be manufactured from a number of individual parts that are formed and dimmensioned in different ways.

German Offenlegungsschrift DE 38 11 788 discloses a plastic front handle for a power chain saw in which the mounting elements for receiving vibration-damping elements of the motor unit are integrated in such a way that the front handle forms a closed entity formed from tubular sections and flat, solid wall sections made of the same material. This known handle encompasses only the front power chain saw handle that accommodates the motor unit, so that independently of this front handle the actual control handle, with its control elements, must be flanged onto the rear portion of the motor unit as a separate component with appropriate reinforcement bars via appropriate connection means.

It is therefore an object of the present invention to embody a plastic handle member for manually guided power chain saws in such a way that the entire handle unit, which comprises a front handle and a rear control handle, including a connecting portion that reinforces the plastic handle and connects the two handle parts in the lower region of the motor unit, is embodied in such a way that the entire handle member can be manufactured in a single operation and is embodied such that no additional connecting and/or reinforcing elements are necessary.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
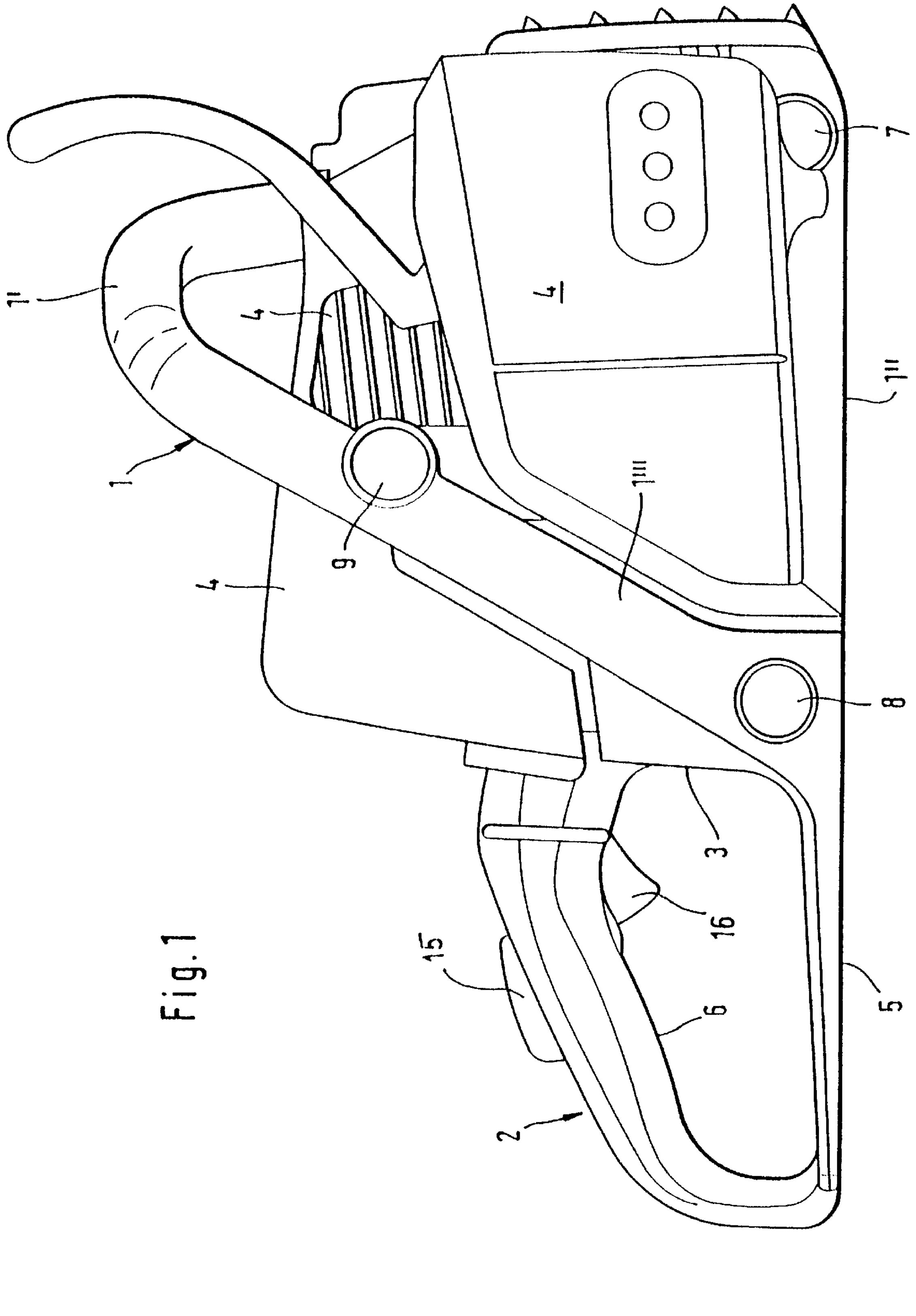
FIG. 1 shows one exemplary embodiment of the inventive self-contained plastic handle member with a motor unit.

The plastic handle member of the present invention is characterized primarily in that the front handle and the rear control handle comprise a one-piece plastic body made of the same material.

In addition, a support member is disposed between the front handle and the control handle to interconnect the front handle and the control handle. Furthermore, the front handle, the rear control handle, and the support member comprise a one-piece plastic body made of a single material and in conjunction with the lower profiled bar form a self-contained force polygon that absorbs load and vibrational forces by means of vibration-damping elements provided in support means disposed between the handle member and a housing of the separate motor unit for holding the housing of the motor unit.

Since the front handle, which surrounds the motor unit, and the rear control handle form a one-piece, uniform plastic body, this plastic body can be economically mass produced so that the previously required connecting elements along with the work required for assembling individual handle parts are eliminated. A further advantage is that the portions of the inventive plastic handle that form a unit are formed in such a way and have such a cross-sectional configuration that all forces that act upon the front and rear regions of the handle member, especially bending forces, torque, and vibrational forces, are absorbed by the handle member, which provides a continuous flow of material and forms a self-contained force polygon, all of this without the flux of force being interrupted by separate connecting elements, as is the case with the heretofore known embodiments.

In order to achieve a simple and rapid installation of the mechanical and/or electrical control elements of the motor, especially for controlling the gas lever or throttle, the upper portion of the rear control handle is embodied as an open half shell or pistol grip with which cooperates a corresponding separate half shell in such a way that the finished handle portion can be produced merely by snapping or latching the separate half shells together.

Pursuant to one preferred specific embodiment of the inventive handle member, the upper portion of the rear control handle is embodied as an open pistol grip half in which in a single manufacturing step and of the same material are formed receiving means for control components that are to be disposed on the upper handle portion. This pistol grip half is rigidly connected to the front handle by providing a specially embodied support member in such a way that when viewed in its entirety, the strength of the handle unit is not weakened by the half shell structure of the rear control handle.

Pursuant to one specific embodiment, this material connection forms an upwardly directed plate, the lower region of which uniformly merges with the lower connecting portion of the rear control handle, the so-called base arm. In this way, on the one hand stability is provided when the power chain saw is placed on the ground, and on the other hand a stable and rigid configuration of the rear control handle as well as of the entire handle member that is resistant to bending and torque is ensured.

Further specific features of the present invention will be described in detail subsequently.

DESCRIPTION OF PREFERRED EMBODIMENTS

Figure 2:
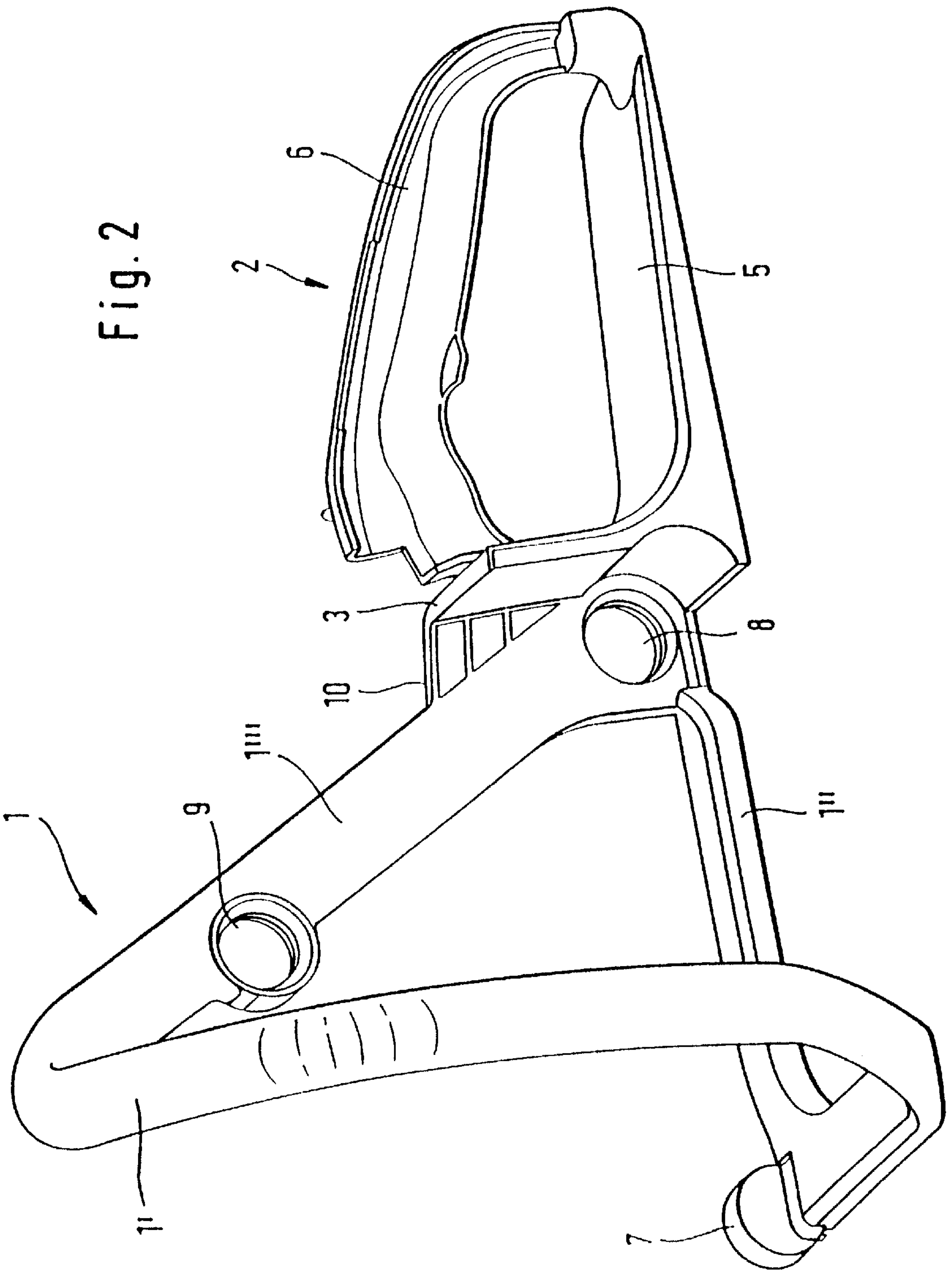
FIG. 2*a* is a perspective view of the entire plastic handle, comprising a front handle and a rear control handle, including the mounting or support means for the vibration-damping elements of the motor unit.
FIG. 2*b* is a perspective view of the handle of FIG. 2*a*, showing vibration-damping elements mounted in the support means.
Figure 2A:
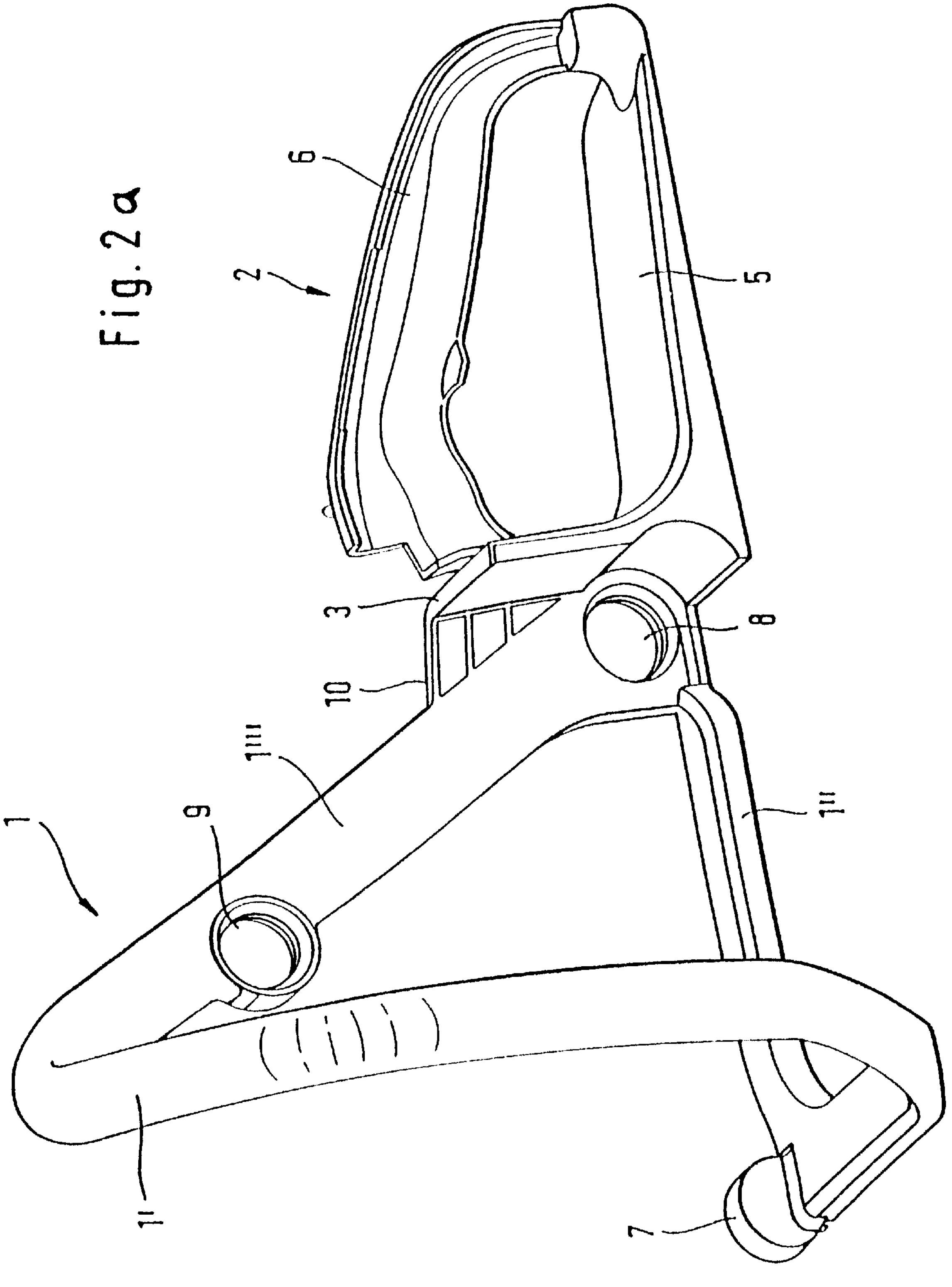
Figure 2B:
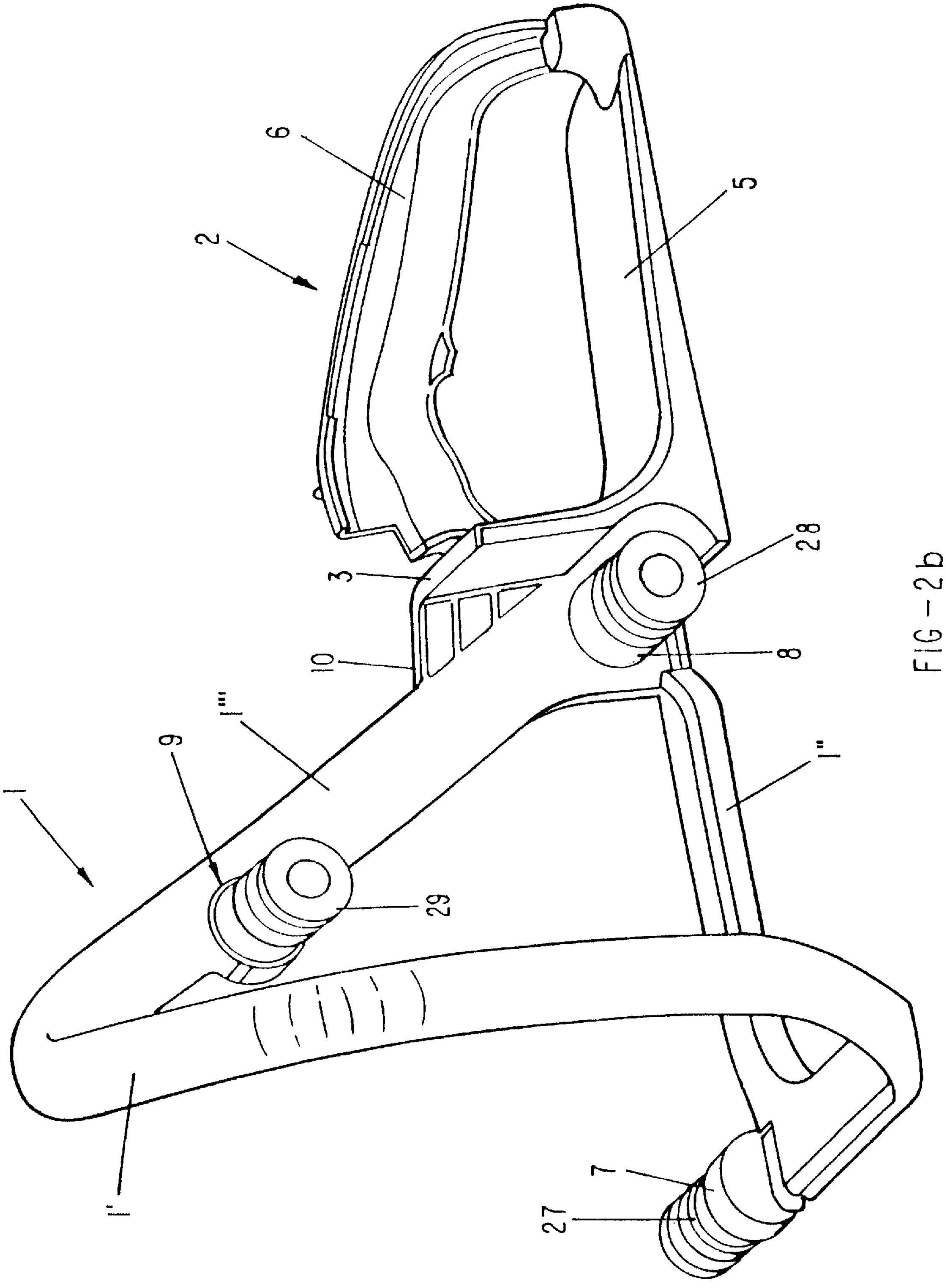
Figure 3:
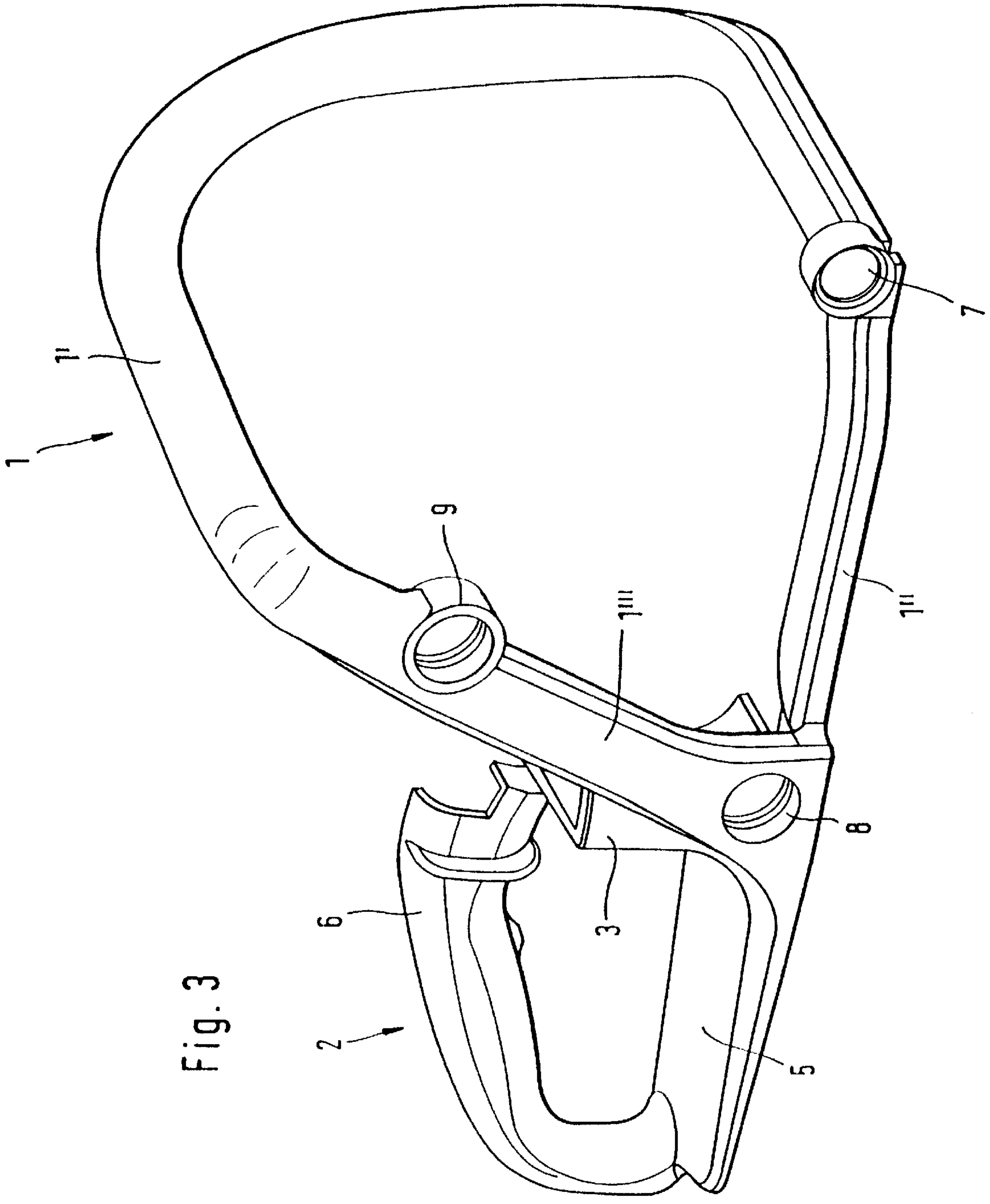
FIG. 3 is a perspective view of the handle of FIG. 2 from a different angle.
Figure 5:
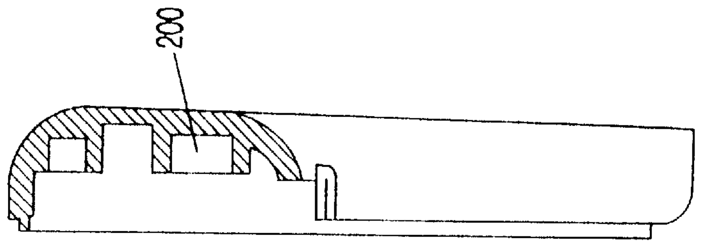
FIG. 5 is a cross-sectional view taken along the line V—V in FIG. 4.
Figure 4:
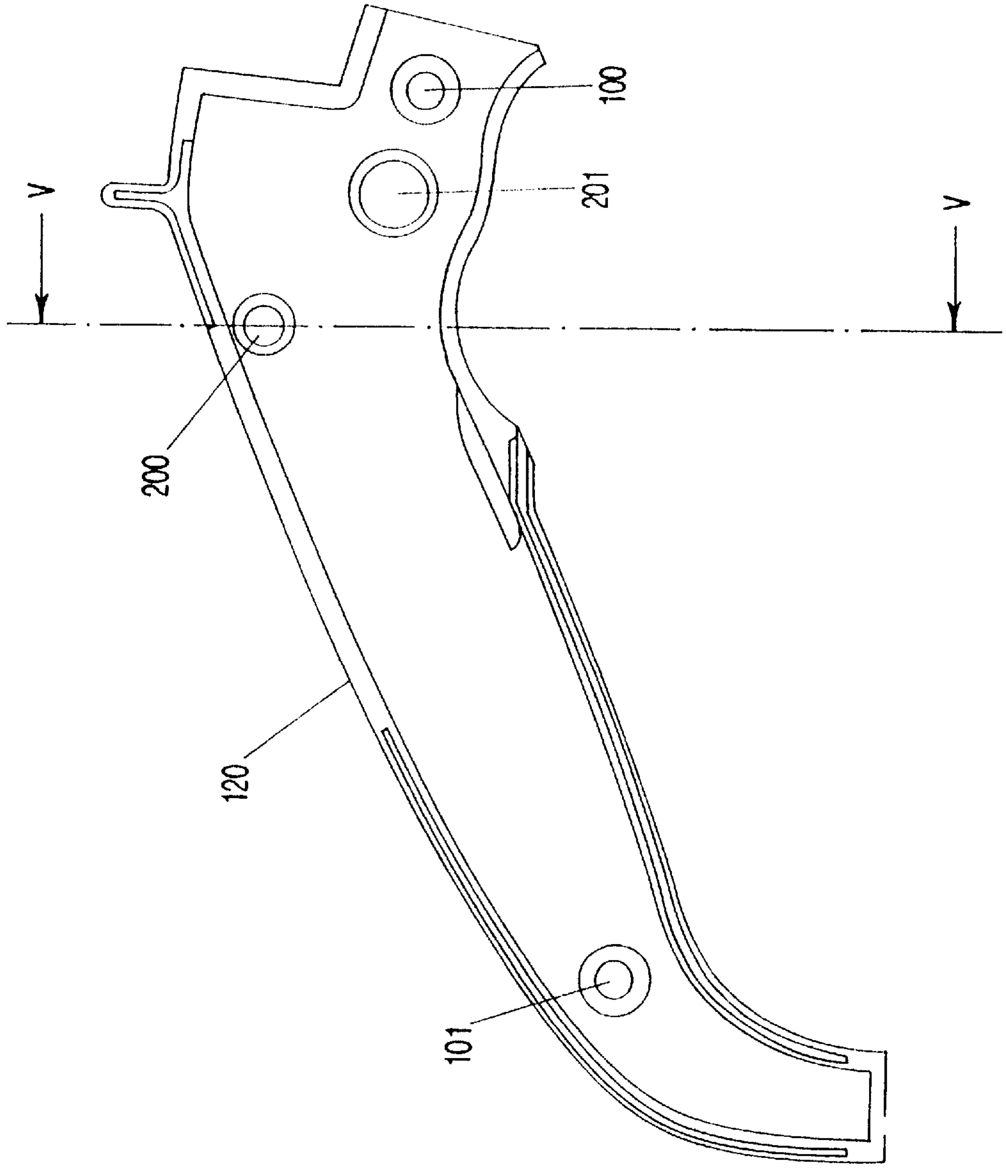
FIG. 4 is a view of the grip cover from the inside that faces the pistol grip half.
Figure 6:
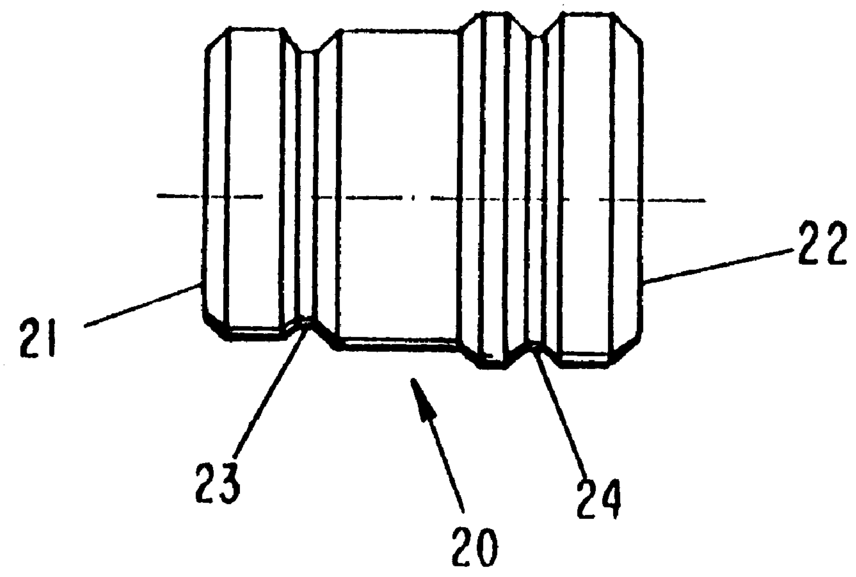
FIG. 6 is a view showing an exemplary embodiment of a vibration-damping element.
Figure 7:
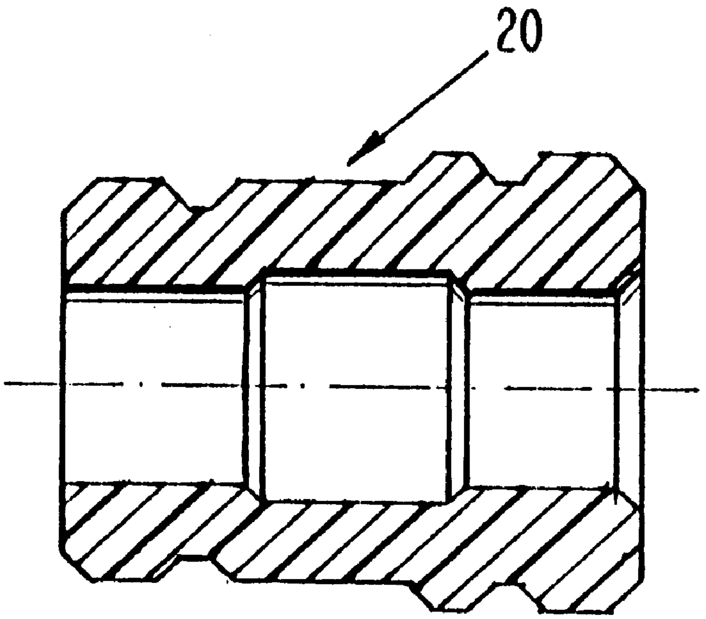
FIG. 7 is a cross-section view of the vibration-damping element of FIG. 6.

Referring now to the drawings in detail, the plastic handle member or means comprises a front handle 1, in which the motor unit 4 is mounted in mounting or support means 7, 8, 9 via the interposition of vibration-damping elements which are shown in FIGS. 2*b*, 6 and 7 and will be described in detail subsequently, and also comprises a rear control handle 2. The upper portion 6 of the control handle 2 is embodied as an open half of a pistol grip (see in particular FIGS. 2 and 3); the upper portion 6 and the lower portion 5 together form the control handle 2. The control parts, such as the gas lever and start and stop elements, are provided in the upper portion 6, which forms the actual handgrip. The front handle 1 and the rear control handle 2 comprise a one-piece closed plastic body that is made of a single material; the plastic body thus forms a self-contained force polygon into which enter the load and torque of the motor unit that act upon the handle member, especially torque and bending forces as well as the vibrations that are caused by the saw chain and the motor.

The upper portion 6 of the control handle 2, which forms the handgrip for the right hand of an operator, is embodied as an open half of a pistol grip in which are formed the individual receiving means for the control components that are to be disposed there (gas lever throttle trigger, throttle blocking means, on and off switch, etc.). Thus, together with the handle 1, the pistol grip half 6 forms a uniform, stable plastic body that absorbs forces.

Separate from the plastic pistol grip half 6, yet conforming to the shape thereof, is a grip cover 120, also in the form of an open half shell, which has corresponding means for receiving or mounting the control components that are to be disposed on the handle. For example, the reference numeral 200 shows a mounting or support means for the throttle blocking means 15 of FIG. 1, while the reference numeral 201 indicates a mounting or support means for the gas lever throttle trigger 16 of FIG. 1. The grip cover 120 is furthermore provided with means, such as latching or locking means, for providing a fixed connection to the pistol grip half 6 of the plastic body. For example, the reference numerals 100 and 101 indicate holes for fastening means such as screws, so that the grip cover 120 can, for example, be screwed onto the pistol grip half 6. The arrangement is therefore such that the separate grip cover can be held on the open pistol grip half 6 that is integrated in the plastic body merely by latching means without the need for other connection elements.

Disposed between the front handle 1 and the pistol grip half 6 for the control handle, which pistol grip half is unwarily and uniformly embodied with the front handle 1, is a support member 3 that connects the front handle 1 and the pistol grip half 6; this support member 3 provides a stable connection between the open pistol grip half 6 and the front handle 1. In addition, the support member 3 forms the connecting element between the open pistol grip half 6 and the base arm 5 of the rear control handle 2 that is disposed below the pistol grip half 6, thereby forming a self-contained, uniform handle member that can absorb the forces that act thereupon and that provides the entire handle unit with a high degree of strength.

Pursuant to one advantageous specific embodiment of the support member 3, which reinforces the overall handle member, the support member is embodied in the manner of a plate that extends upwardly from the lower base arm 5 and preferably is of such a size that when viewed from above it has nearly the same width as the base arm 5. In order to even further increase the stability or rigidity of the plate-like support member 3, reinforcing means, preferably ribs 10 (see FIG. 2), are provided that establish a fixed and rigid connection to that portion of the handle 1 that extends upwardly and toward the front.

The front handle 1 has a portion 1' that extends over the top of the motor unit 4 and that serves as a handgrip for the operator. The portion 1' is preferably tubular and is economically guided for a comfortable handling by the left hand of the operator. The handle 1 has three mounting means 7, 8, 9 for receiving the vibration-damping elements 27, 28 and 29 (FIG. 2*b*) for holding the motor unit 4, with these mounting means being embodied in the manner of mounting or support journals that receive the vibration-damping elements 27, 28 and 29. One of the mounting means 7 is disposed in the forward region of the lower profiled bar 1" of the handle 1, a second mounting means 8 is disposed at the same level in the central region at the transition between the base arm 5 and the handle 1, and the third mounting means 9 is disposed above or higher than the two mounting means 7, 8 at the transition between a profiled, upwardly angled solid handle bar 1'" and the portion 1' of the handle 1. To provide the unique vibration-damping effect not only with respect to the vibrations generated by the motor, but also with respect to vibrations having an external source, such as those produced during a cutting operation during impacts with the chain saw and from the chain saw itself, the vibration-damping elements 27, 28 and 29 of the present invention are disposed in these support means 7, 8 and 9 between the inventive handle and the housing of the motor unit 4. One exemplary embodiment of such a vibration-damping element is shown in FIGS. 6 and 7 as an elastomeric round or barrel-shaped cushion or shock absorber 20. The vibration-damping elements 27, 28 and 29 are comparable to this shock absorber 20, which will now be described in greater detail. In particular, with reference to FIG. 6, the left end 21 of the shock absorber 20 is received in one of the support means 7, 8 and 9, while the right end 22 of the shock absorber 20 is adapted to engage in an appropriate opening of the motor unit housing 4 illustrated in FIG. 1, so that the vibration-damping elements 27, 28 and 29 are disposed between the handle and the housing of the motor unit 4. To secure the shock absorber 20, i.e. 27, 28 and 29, in a respective one of the support means 7, 8 and 9, the shock absorber 20 is provided with an annular groove 23 that is engaged by a radial projection of the inventive handle (see, for example, FIGS. 2*a* and 2*b*). Similarly, to axially secure the shock absorber 20 in the motor unit 4, the shock absorber is provided with a further annular groove 24, as shown in FIG. 6. The lower portion of the handle 1 as well as the base arm 5 of the rear control handle 2 are made of solid plastic sections having a preferably angular cross-sectional configuration, namely planar rectangular. The same is true for the handle bar 1''', which is directed upwardly and toward the front at an angle from the mounting means 8, and which also has a planar rectangular cross-sectional configuration and is made of solid material. On the whole, the present invention thus provides a lighter weight yet extremely rigid support and mounting of the motor unit in the region of the mounting or support means 7, 8, 9.

The present invention is, of course, in no way restricted to the specific disclosure of the specification and drawings, but also encompasses any modifications within the scope of the appended claims.

What I claim is:

1. A plastic handle member for manually guided power chain saws, said handle member comprising:

a single piece of plastic including a front handle having a lower profiled bar, a rear control handle and a support member disposed between the front handle and the rear control handle to connect said front handle and said control handle;

said front handle being at least partially tubular and serving for holding a separate motor unit; said rear control handle includes an upper portion for accommodating components for controlling a chain saw; said front handle, said support member and said lower profiled bar singularly forming a polygon that absorbs load and vibrational forces; support means respectively disposed in said front handle, in said lower profiled bar, and in said support member; and vibration-damping elements provided in said support means such that said vibration-damping elements are disposed between a housing of said motor unit and those parts of said handle member in which said support means are disposed to thereby effect said absorption of said load and vibrational forces.

2. A handle member according to claim 1, wherein said upper portion of said control handle is an open pistol grip half that is provided with receiving means for said components.

3. A handle member according to claim 2, which includes a grip cover that is separate from said pistol grip half and is in the form of a half shell that conforms to the shape of said pistol grip half, said grip cover being provided with means for affecting a latching connection to said pistol grip half of said plastic body.

4. A handle member according to claim 3, wherein said means are latching means.

5. A handle member according to claim 2, wherein said support member is disposed between said front handle and said pistol grip half of said control handle, said support member forming a unitary plastic portion with said front handle.

6. A handle member according to claim 5, wherein said support member is in the form of a plate, a lower portion of which merges with a flat base arm of said control handle, and wherein said base arm and said pistol grip half form said control handle as a self-contained control handle.

7. A handle member according to claim 6, wherein said support member and said base arm have substantially the same width.

8. A handle member according to claim 5, wherein said support member projects upwardly and is reinforced at said front handle by ribs of the same material.

9. A handle member according to claim 6, wherein a lower portion of said front handle, and said base arm of said control handle, are embodied as solid plastic profiled portions.

10. A handle member according to claim 9, wherein said profiled portions have an angular cross-sectional configuration.

11. A handle member according to claim 9, wherein an upper portion of said front handle has a tubular configuration and serves as a handgrip.

12. A handle member according to claim 1, wherein said support means comprise three support means for holding said motor unit, including a first support means disposed in a forward region of said lower profiled bar of said front handle, a second support means that is disposed at approximately the same level as said first support means in a central region of said handle member at a transition between a base arm of said control handle and said front handle, and a third support means that is disposed higher than said first and second support means at a transition between an upper portion of said front handle and an upwardly angled, profiled, solid material bar of said front handle.

13. A handle member according to claim 12, wherein each of said vibration-damping elements is a round, elastomeric shock absorber, a respective one of which is disposed in each of said support means.

14. A handle member according to claim 13, wherein one end of each said elastomeric shock absorber is secured in one of said support means, while another end of each said shock absorber holds said housing of said motor unit.

* * * * *